(12) United States Patent
Drees

(10) Patent No.: US 7,100,750 B2
(45) Date of Patent: Sep. 5, 2006

(54) ASSEMBLY FOR A HYDRAULIC DASHPOT

(75) Inventor: Helmut Drees, Ennepetal (DE)

(73) Assignee: ThyssenKrupp Bilstein GmbH, Ennepetal (DE)

( * ) Notice: Subject to any disclaimer, the term of this patent is extended or adjusted under 35 U.S.C. 154(b) by 289 days.

(21) Appl. No.: 10/748,576

(22) Filed: Dec. 30, 2003

(65) Prior Publication Data
US 2004/0149530 A1 Aug. 5, 2004

(30) Foreign Application Priority Data
Jan. 7, 2003 (DE) .............................. 103 00 107

(51) Int. Cl.
F16F 9/34 (2006.01)

(52) U.S. Cl. .................. 188/322.15; 188/280

(58) Field of Classification Search ................ 188/280, 188/322.22
See application file for complete search history.

(56) References Cited

U.S. PATENT DOCUMENTS

| 3,232,390 | A | * | 2/1966 | Takashi | ........................ 188/280 |
| 3,896,908 | A | * | 7/1975 | Petrak | ........................ 188/280 |
| 4,765,446 | A | * | 8/1988 | Murata et al. | ............ 188/282.4 |
| 5,248,014 | A | * | 9/1993 | Ashiba | ..................... 188/282.8 |
| 5,386,892 | A | * | 2/1995 | Ashiba | ..................... 188/282.8 |
| 5,566,796 | A | * | 10/1996 | De Kock | .................. 188/282.1 |
| 6,131,709 | A | * | 10/2000 | Jolly et al. | ................. 188/267.2 |
| 6,220,409 | B1 | * | 4/2001 | Deferme | ................. 188/322.15 |
| 6,241,060 | B1 | * | 6/2001 | Gonzalez et al. | ......... 188/319.2 |
| 6,561,326 | B1 | * | 5/2003 | Gotz | ...................... 188/322.15 |
| 6,651,787 | B1 | * | 11/2003 | Grundei | ....................... 188/280 |
| 6,918,473 | B1 | * | 7/2005 | Deferme | ................. 188/322.15 |
| 2003/0051957 | A1 | * | 3/2003 | Lemieux | ................. 188/322.15 |

* cited by examiner

Primary Examiner—Robert A. Siconolfi
(74) Attorney, Agent, or Firm—Max Fogiel

(57) ABSTRACT

An assembly for a hydraulic dashpot. The dashpot is accommodated in an overall housing (1) and provided with a shock-absorbing piston (3) traveling back and forth inside the housing on one end of a piston rod (2) and partitioning the housing into two compartments (19 & 23), and a vibration-compensating piston (11) hydraulically paralleling the first piston and accommodated inside a subsidiary housing (10).

The object of is to ensure a solid and reliable connection between the shock-absorbing piston and the piston rod while allowing as much of the piston rod as possible to find support inside the housing.

The vibration-compensating piston is accordingly an annular piston and travels back and forth with its inner surface resting against a section (9) of the piston rod adjacent to the fastening for the shock-absorbing piston, and with its outer surface against the inner surface of the subsidiary housing.

8 Claims, 1 Drawing Sheet

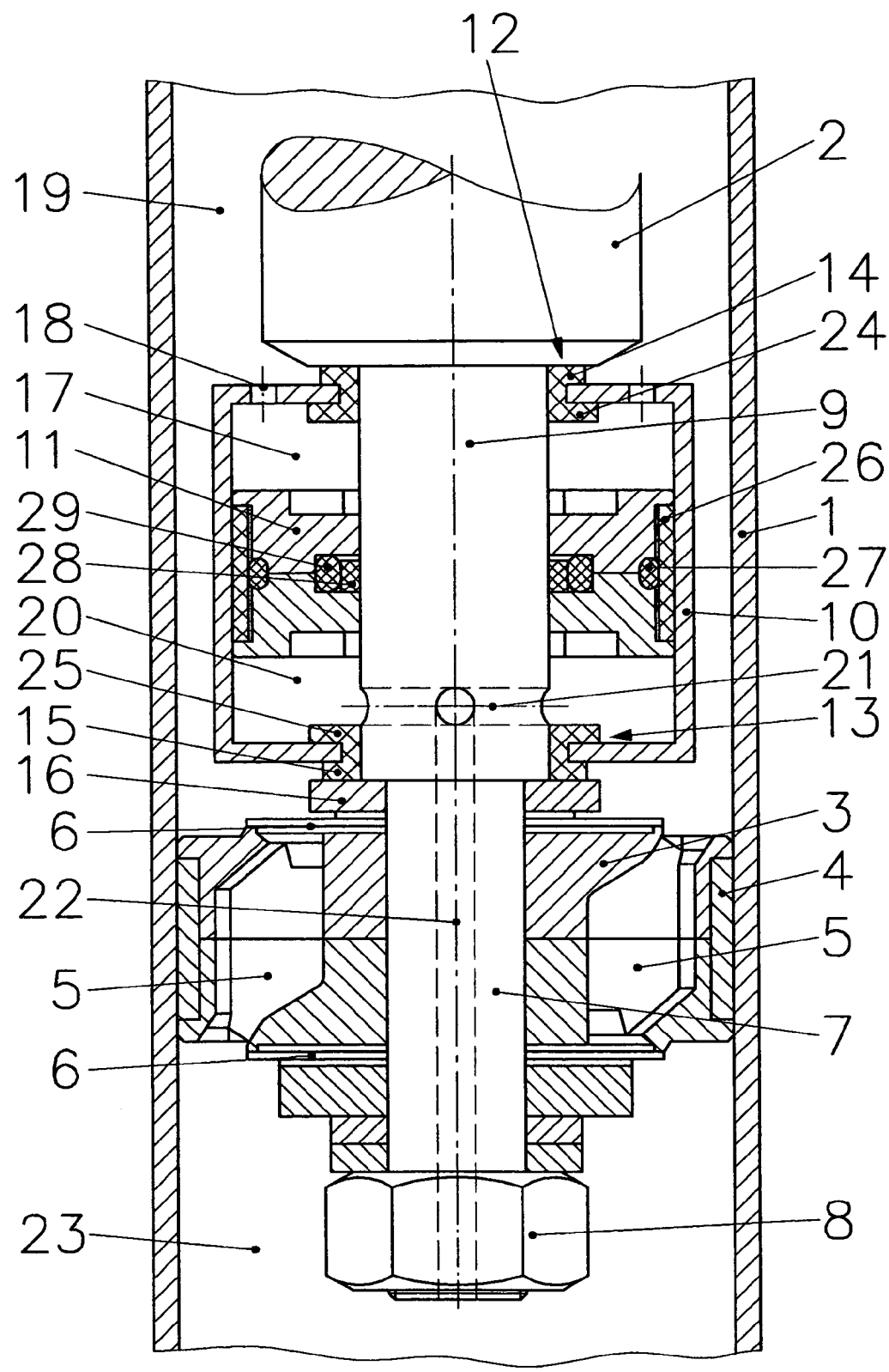

ASSEMBLY FOR A HYDRAULIC DASHPOT

BACKGROUND OF THE INVENTION

The present invention concerns an assembly for a hydraulic dashpot. The dashpot is accommodated in a housing that is partitioned into two compartments by a shock-absorbing piston mounted on one end of a piston rod and accordingly traveling back and forth inside the housing. Dashpots of this genus can be solid walled or hollow-walled. The shock-absorbing piston is transversed by fluid-conveying channels provided with stacks of cupsprings that open and close to control the flow in both the vacuum phase and the pressure phase.

Low-amplitude oscillations sometimes reach the piston rod and break the cupsprings loose, leading to irregular shock absorption. European Patent 1 152 166 A1 proposes counteracting this tendency using another, vibration-compensating, piston hydraulically paralleling the shock-absorbing piston but accommodated in a subsidiary housing. The vibration-compensating piston in one embodiment is mounted on the face of the shock-absorbing piston more remote from the piston rod. There is a drawback here in that rod's radial moment of support is too short. In one alternative embodiment, the vibration-compensating piston is mounted in an adaptor between the end of the piston rod and the shock-absorbing piston. Here again there are drawbacks—the design is complicated and the shock-absorbing piston is of course not as rigidly fastened to the piston rod.

SUMMARY OF THE INVENTION

The object of the present invention is to eliminate the drawbacks inherent in the state of the art described in the forgoing and to improve the design and position of the vibration-compensating piston, ensuring a solid and reliable connection between the shock-absorbing piston and the piston rod while allowing as much of the piston rod as possible to find support inside the housing.

This object is attained in accordance with the present invention in an assembly of the aforesaid genus which has several advantages. Specifically, a vibration-compensating piston accommodated in a subsidiary housing can be simple in design and simple to install at the end of the piston rod upstream of the shock-absorbing piston, allowing the greatest possible radial support for the piston rod against the housing by way of the shock-absorbing piston.

One embodiment of the present invention will now be specified with reference to the accompanying drawing.

BRIEF DESCRIPTION OF THE DRAWINGS

The sole FIGURE represents a cross-section through the dashpot at the end of the piston rod.

DESCRIPTION OF THE PREFERRED EMBODIMENTS

The dashpot is provided with an overall housing 1 with a solid cap at one end and a cap perforated by a central bore at the other, and is full of shock-absorbing fluid. A piston rod 2 travels into and out of the housing through the bore.

A shock-absorbing piston 3 is mounted on the end of piston rod 2 and slides back and forth against the inner surface of housing 1. A cuff 4 of low-friction material seals shock-absorbing piston 3 off from housing 1.

Breaches 5 allow the fluid to flow through shock-absorbing piston 3 and are individually closed off on one face by a stack of cupsprings 6. Depending on the direction being traveled by piston rod 2, cupsprings 6 either act as check-valves or determine the level of shock absorption in accordance with how rapidly the fluid is flowing through breaches 5.

Shock-absorbing piston 3 is mounted around a bolt 7 at one end of piston rod 2 and secured there by a nut 8.

The section 9 of piston rod 2 adjacent to bolt 7 is wider than the bolt. A subsidiary housing 10 is mounted around section 9 before shock-absorbing piston 3 is introduced. Subsidiary housing 10 accommodates an annular piston 11, which it must accordingly be sectional to accept, a characteristic not illustrated in the drawing.

Subsidiary housing 10 is cylindrical, each base being provided with a central bore, slightly wider in the illustrated example than section 9 of piston rod 2. Accommodated in these bores are seals 12 and 13. The edges of seals 12 and 13 are provided with flanges 14 and 15 that radially overlap the upper and lower surfaces of housing 10, sealing it off radially from section 9. Flanges 14 and 15 rest radially against piston rod 2 at the top and against a gasket 16 interposed between shock-absorbing piston 3 and housing 10 at the bottom. Tolerances can be compensated by the resilience of flanges 14 and 15.

Annular piston 11 travels back and forth axially inside subsidiary housing 10 and is radially sealed off against section 9 of the piston rod and against the inner surface of the housing. The space 17 accordingly created at the top of housing 10 communicates hydraulically with the dashpot's upper shock-absorption compartment 19 by way of bores 18. The lower shock-absorption compartment 20 communicates hydraulically with the space 23 at the bottom of housing 10 by way of transverse bores 21 and of a longitudinal bore 22 through the axis of the piston rod. As piston rod 2 oscillates at low amplitudes in relation to overall housing 1, annular piston 11 will travel back and forth axially inside subsidiary housing 10 without lifting cupsprings 6 off of breaches 5.

Since the axial motion of annular piston 11 is limited by the length of subsidiary housing 10, the magnitude of the amplitudes that can be handled by the vibration-compensating piston is also limited. The flanges 24 and 25, resting against the inner surface of subsidiary housing 10, of seals 12 and 13 can be of flexible plastic to cushion the impact of annular piston 11 against the base of subsidiary housing 10.

The annular piston 11 in the illustrated embodiment is in two identically shaped halves that rest together face to face. The piston travels along the inner surface of subsidiary housing 10 sealed tight by a centering-and-sealing cuff 26. Cuff 26 is subject to tension applied by an O ring 27 that can also help keep the components of annular piston 11 together, although the same task can be otherwise performed. Annular piston 11 is sealed off against section 9 of the piston rod by a two-part seal comprising a loosely sliding ring 28 and another O ring 29.

The circumference of section 9 need not, as illustrated, be graduated down to the circumference of bolt 7 or piston rod 2. It can also equal these circumferences.

The invention claimed is:

1. An arrangement for a hydraulic dashpot in a housing and having two pistons comprising a shock-absorbing piston connected to a piston rod and traveling back and forth inside said housing on one end of said piston rod and partitioning said housing into two chambers; a subsidiary housing; a vibration-compensating piston in said subsidiary housing and hydraulically in parallel with said shock-absorbing piston and comprising an annular piston with an inner surface, said vibration-compensating piston traveling back and forth with said inner surface resting against a section of said piston rod adjacent to a fastening for said shock-absorbing piston, said vibration-compensating piston having an outer surface resting against an inner surface of said subsidiary housing.

2. An arrangement as defined in claim 1, wherein said section of said piston rod is thinner than the remainder of said piston rod.

3. An arrangement as defined in claim 1, including loosely sliding rings on said vibration compensating piston and matching a circumference of said vibration-compensating piston.

4. An arrangement as defined in claim 3, wherein said rings rest tightly against said inner section of said piston rod and against a bore extending through said first-mentioned housing.

5. An arrangement as defined in claim 2, wherein said subsidiary housing has bases with central openings for allowing said subsidiary housing to slide over said thinner section of said piston rod.

6. An arrangement as defined in claim 5, including sealing means between said openings of said subsidiary housing and said thinner section of said piston rod.

7. An arrangement as defined in claim 6, including flanges on said sealing means and radially overlapping upper and lower surfaces of said subsidiary housing.

8. An arrangement for a hydraulic dashpot in a housing and having two pistons comprising a shock-absorbing piston connected to a piston rod and traveling back and forth inside said housing on one end of said piston rod and partitioning said housing into two chambers; a subsidiary housing; a vibration-compensating piston in said subsidiary housing and hydraulically in parallel with said shock-absorbing piston and comprising an annular piston with an inner surface, said vibration compensating piston traveling back and forth with said inner surface resting against a section of said piston rod adjacent to a fastening for said shock absorbing piston, said vibration-compensating piston having an outer surface resting against an inner surface of said subsidiary housing; said section of said piston rod being thinner than the remainder of said piston rod; loosely sliding rings on said vibration compensating piston and matching a circumference of said vibration-compensating piston; said rings resting tightly against said inner section of said piston rod and against a bore extending through said first-mentioned housing; said subsidiary housing having bases with central openings for allowing said subsidiary housing to slide over said thinner section of said piston rod; sealing means between said openings of said subsidiary housing and said thinner section of said piston rod; flanges on said sealing means and radially overlapping upper and lower surfaces of said subsidiary housing.

* * * * *